(12) United States Patent
Garbanati et al.

(10) Patent No.: US 7,451,452 B2
(45) Date of Patent: *Nov. 11, 2008

(54) METHODS AND SYSTEMS OF VERIFYING EMS COMPLIANCE VIA NMS INTERFACE

(75) Inventors: Linda Jean Freede Garbanati, San Ramon, CA (US); Mark Yampanis, Berkeley, CA (US); Mehrad Yasrebi, Austin, TX (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/643,134

(22) Filed: Dec. 21, 2006

(65) Prior Publication Data

US 2007/0157215 A1    Jul. 5, 2007

Related U.S. Application Data

(63) Continuation of application No. 10/191,785, filed on Jul. 8, 2002, now Pat. No. 7,174,555.

(51) Int. Cl.
*G06F 13/00* (2006.01)

(52) U.S. Cl. ................ 719/313; 719/328; 719/330; 709/223

(58) Field of Classification Search .......... 719/313, 719/328, 330; 709/223
See application file for complete search history.

(56) References Cited

U.S. PATENT DOCUMENTS

| | | | |
|---|---|---|---|
| 5,627,979 A | 5/1997 | Chang et al. | |
| 5,751,941 A | 5/1998 | Hinds et al. | |
| 5,881,315 A | 3/1999 | Cohen | |
| 5,978,940 A | 11/1999 | Newman et al. | |
| 6,161,136 A | 12/2000 | Hyndman et al. | |
| 6,226,692 B1 | 5/2001 | Miloushev et al. | |
| 6,247,052 B1 | 6/2001 | Huang et al. | |
| 6,256,676 B1 | 7/2001 | Taylor et al. | |
| 6,263,255 B1 | 7/2001 | Tan et al. | |
| 6,295,540 B1 | 9/2001 | Sanschagrin et al. | |
| 6,363,421 B2 | 3/2002 | Barker et al. | |
| 6,373,822 B1 | 4/2002 | Raj et al. | |
| 6,782,420 B1 * | 8/2004 | Barrett et al. | 709/223 |
| 6,883,118 B2 | 4/2005 | Morgan et al. | |
| 7,042,847 B2 * | 5/2006 | Gourley et al. | 370/242 |
| 7,092,364 B1 * | 8/2006 | Franklin et al. | 370/252 |
| 7,174,555 B2 | 2/2007 | Freede Garbanati et al. | |
| 2001/0052006 A1 | 12/2001 | Barker et al. | |
| 2001/0052113 A1 | 12/2001 | Hearne et al. | |

(Continued)

OTHER PUBLICATIONS

"Passive Optical Network," Definition, 1 page, Jul. 31, 2001.

(Continued)

*Primary Examiner*—Andy Ho
(74) *Attorney, Agent, or Firm*—Brinks Hofer Gilson & Lione

(57) ABSTRACT

A test harness tests an element management system (EMS) via a network management system (NMS) interface for compliance with a particular interface standard. The test harness may be used by a party other than a vendor of the EMS to verify compliance of the EMS to the particular interface standard, such as Q.834.4.

19 Claims, 4 Drawing Sheets

U.S. PATENT DOCUMENTS

| | | | |
|---|---|---|---|
| 2002/0023109 | A1 | 2/2002 | Lederer, Jr. et al. |
| 2002/0129110 | A1* | 9/2002 | Liu et al. .................... 709/206 |
| 2002/0165997 | A1 | 11/2002 | Hunsinger et al. |
| 2003/0065761 | A1 | 4/2003 | Cereja et al. |
| 2003/0153991 | A1 | 8/2003 | Visser et al. |
| 2003/0195892 | A1 | 10/2003 | Dhanda |
| 2004/0005038 | A1 | 1/2004 | Garbanati et al. |
| 2004/0049561 | A1* | 3/2004 | Tafazolli et al. ............. 709/220 |

OTHER PUBLICATIONS

"Passive Optical Networks," David Greenfield, Network Magazine, 4 pages, Dec. 5, 2001.

"SBC Shifts Focus from DSL to Passive Optical Nets," Loring Wirbel, EE Times, 2 pages, Nov. 27, 2001.

"Draft Q.834.4—A CORBA Interface Specification for Broadband Passive Optical Networks Based on UML Interface Requirements," ITU—Telecommunication Standardization Sector, 171 pages, Mar. 15, 2002.

"Broadband Optical Access Systems Based On Passive Optical Networks (PON)," ITU-U Recommendation G.983.1, 119 pages, Oct. 1998.

* cited by examiner

METHODS AND SYSTEMS OF VERIFYING EMS COMPLIANCE VIA NMS INTERFACE

RELATED APPLICATIONS

The present application is a continuation of U.S. patent application Ser. No. 10/191,785 (now U.S. Pat. No. 7,174,555), filed Jul. 8, 2002, the entirety of which is hereby incorporated by reference.

BACKGROUND

1. Field of the Invention

The present invention relates to methods and systems for verifying compliance with a software interface standard.

2. Description of the Related Art

Currently, when a telecommunications carrier deploys a technology into operations, the entire system comprising hardware and software used to manage the technology is supplied by one or more equipment vendors. Generally, there are multiple vendors for a particular technology in use at any one time in a carrier network. This creates a situation where the carrier has to learn, design to, and manage several different vendor-specific software applications for a single technology.

Common Object Request Broker Architecture (CORBA) as standardized by the Object Management Group (OMG) forum, is a framework for communications between software programs. In particular, CORBA provides for standard interfaces between Object Request Brokers (ORBs). CORBA interfaces are specified using OMG Interface Definition Language (IDL). A particular CORBA interface standard is defined in ITU-T Draft Recommendation Q.834.4. Vendors have committed to prototyping to the Q.834.4 interface.

FIG. 1 is a block diagram showing how, using Q.834.4, a carrier can build a single application to manage a technology implementation by multiple vendors. A carrier network 20 is comprised of one or more network elements 22 from a first vendor (Vendor A) combined with one or more network elements 24 from a second vendor (Vendor B). A first operator 26 manages the network elements 22 of Vendor A using an Element Management System (EMS) 28. Likewise, a second operator 30 manages the network elements 24 of Vendor B using an EMS 32. The first operator 26 is unable to manage the network elements 24 of Vendor B using the EMS 32 without acquiring additional skills. The second operator 30 is unable to manage the network elements 22 of Vendor A using the EMS 28.

If properly implemented, Q.834.4 interfaces enable a third operator 34 to manage the entire carrier network 20 with the same software application. In particular, the third operator 34 can efficiently manage all network resources in the network elements 20 and 22 using a carrier Network Management System (NMS) 36. The NMS 36 communicates with the EMS 28 and the EMS 32 using interfaces 38 and 40, that are instances of the same specification found in Q.834.4. Additionally, there are a myriad of higher level software applications that benefit from having a common interface with these vendor networks.

NMS interoperability is a long-term goal for large service providers. EMS vendors, being aware of the goal, supply software marketed as "CORBA Compliant" or with an "IDL Interface" with specific syntax and semantics. In some cases, the advertised interface claims to conform to some standardized interface definition, however these claims are not verified.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

The need arises for a carrier to verify that vendor networks can in fact be managed through an interface between an NMS and an EMS, such as a Q.834.4 interface. Embodiments of the present invention address this need and other needs by providing a test harness which executes aspects (some or all) of the Q.834.4 interface and determines to what extent the vendor has created a successful implementation. The test harness may perform every operation defined by an EMS-NMS IDL interface specification. The test harness may be used by a service provider, a carrier network, or another party other than the vendor to test a vendor's implementation. Feedback can be provided by the party to the vendor at an earlier stage in the development of their software applications. The ability to verify adherence to standards at an early stage provides an incentive for the vendors to help service providers meet the long-term interoperability goal.

Figure 1:
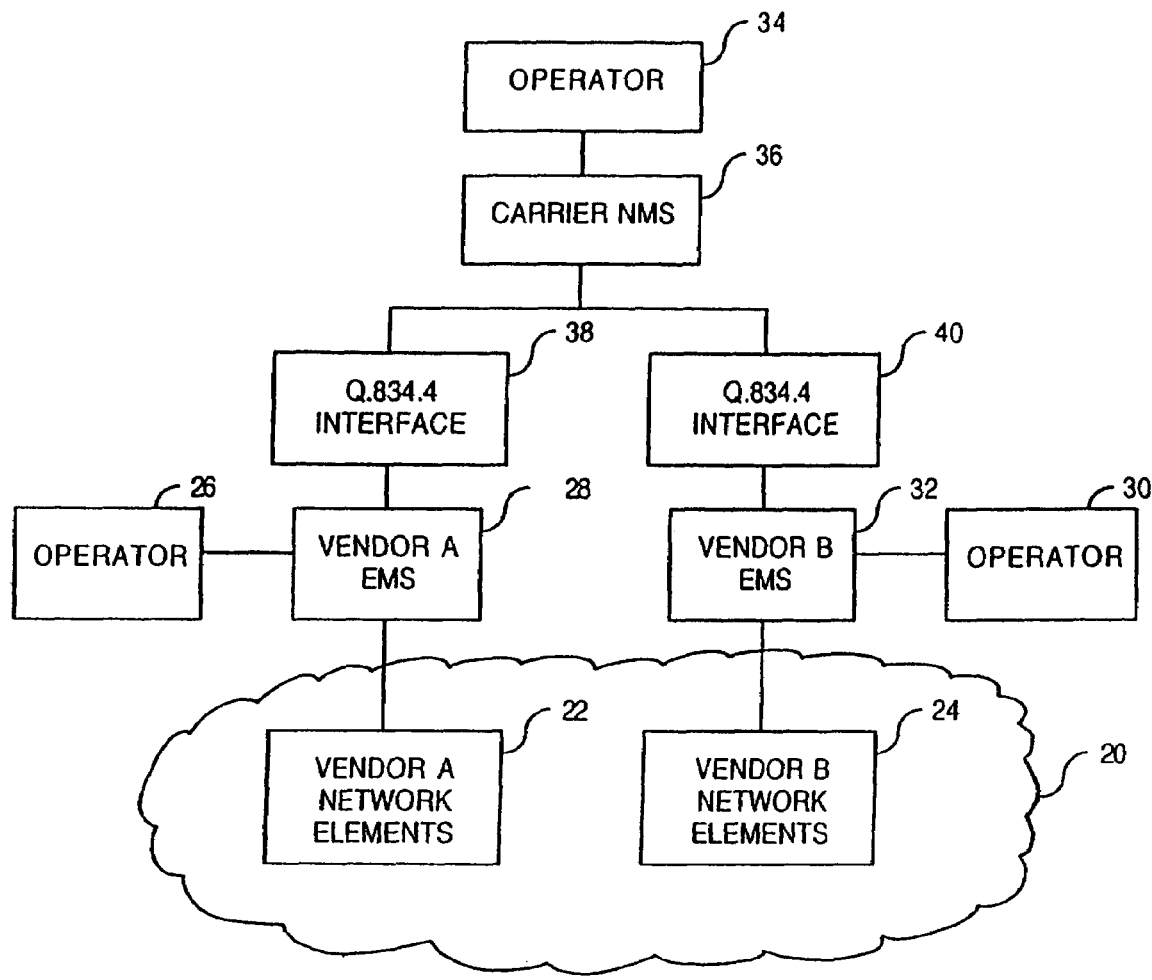
FIG. 1 is a block diagram showing how, using Q.834.4, a carrier can build a single application to manage a technology implementation by multiple vendors.
Figure 2:
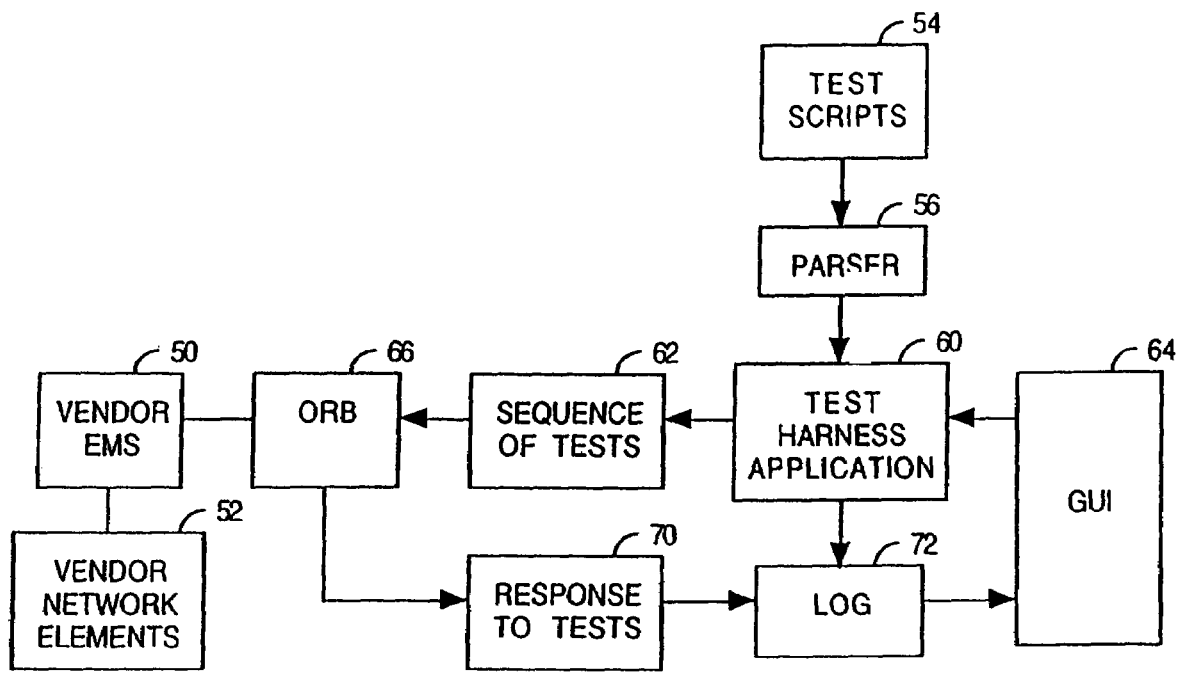
FIG. 2 is a block diagram of an embodiment of a system for testing a vendor-supplied EMS used to manage one or more vendor network elements.

FIG. 2 is a block diagram of an embodiment of a system for testing a vendor-supplied EMS 50 used to manage one or more vendor network elements 52. Preferably, only an interface aspect (e.g. a Q.834.4 interface) of the vendor-supplied EMS 50 is tested using the system. In this case, functions of a graphical user interface (GUI) associated with the vendor-supplied EMS 50 would not be tested, for example. In alternative embodiments, however, non-interface aspects of the vendor-supplied EMS may be tested using the system.

The system comprises test scripts 54 which define individual tests and test sequences of actions specified in the Q.834.4 standard. The test scripts 54 are prepared by a user before testing begins. The Q.834.4 interface is specified using CORBA IDL. Since this is an evolving standard, embodiments of the present invention may be adapted based on future versions of the IDL. Several hundred individual functions are described in the standard.

A parser 56 translates the test scripts 54 into sequences of CORBA messages. A tester module 60 cooperates with the parser 56 to automatically execute a sequence of tests 62 based on the CORBA messages as directed by a user through a GUI 64. The CORBA messages in the tests 62 are communicated over Internet Inter-Orb Protocol (IIOP) sessions through an Object Request Broker (ORB) 66 to the vendor-supplied EMS 50.

The vendor-supplied EMS 50 generates responses 70 to the sequence of tests 62. Based on the responses 70, test results are written to a log 72 such as a flat file log. Expected stimulation and response from the vendor-supplied EMS 50, as well as unexpected events are recorded in the log 72 and displayed to the user using the GUI 64.

A simulated vendor EMS may be used in place of the vendor-supplied EMS 50 to verify that the testing system is functioning as expected. The simulated vendor EMS acts as a virtual ideal EMS. Upon verification using the simulated vendor EMS, the system may be used to test the vendor-supplied EMS 50.

Acts performed by the system are directed by computer software code stored by a computer-readable medium. A preferred implementation of the system is written using JAVA, although alternative software languages may be used. Examples of the computer-readable medium include, but are not limited to, a magnetic storage medium, an optical storage medium, and an electronic storage medium.

A specific example of a carrier network is described hereinafter to illustrate a practical application of embodiments of the present invention. In September 1999, SBC Communications Inc. issued a request-for-proposal (RFP) seeking a fiber-based access system that would be cost-effective in serving small to medium sized businesses. Services to be provided included traditional time-division multiplexed (TDM) traffic at DS1 and DS3 rates as well as packet data traffic. Requirements for this system included compliance with the Full Service Access Network (FSAN) standards for ATM Passive Optical Network (APON) found in ITU-T documents G.983.1 and G.983.2. The target customers for the system covered by the RFP are small to medium-sized businesses that have total telecommunications needs in the range of 2 to 30 DS1 equivalents. Deployment was anticipated to be in both "green-field" areas where fiber cable would be placed directly to anticipated business locations and in established locations where there is already fiber cable in proximity to the business. The actual primary initial implementation is to occur to customer locations currently receiving DS1 service through copper T1 access links with repeaters. Replacement of these links by fiber greatly reduces the presence of interference for DSL services carried in the same copper cable.

Figure 3:
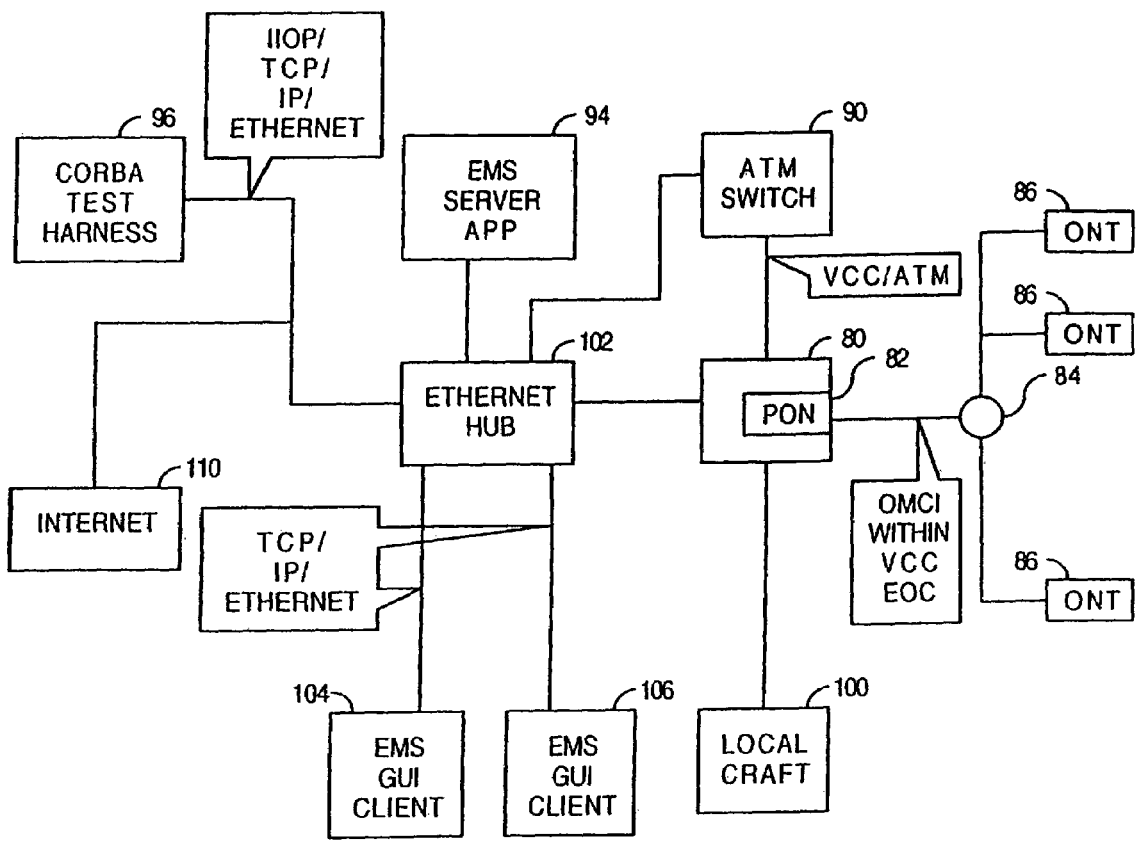
FIG. 3 is a schematic block diagram of a deployment of an ATM Passive Optical Network (APON) system.

FIG. 3 is a schematic block diagram of a deployment of an ATM Passive Optical Network (APON) system. An Optical Line Terminal (OLT) 80 is located in a Central Office (CO) and supports multiple Passive Optical Networks (PONs) in the outside plant. Each PON, such as PON 82, comprises a single optical fiber transporting bi-directional 155 Mbps signals from the OLT 80 to a passive coupler 84. The coupler 84 may be deployed in a splice case, pedestal, or existing remote electronics site. The coupler 84 splits the signal into as many as 32 fibers that each terminate at an Optical Networking Termination (ONT) 86. The planning process for fiber-to-the-business suggests an implementation splitting ratio of 1 by 12. Each of the ONTs 86 is located at a customer premise to serve either a single customer or a few customers located in close proximity, such as in a strip mall. In either case, they remain the property of the network provider. The ONTs 86 are to be located indoors or in a controlled environment at the customer site.

Network interfaces to the OLT 80 in the CO are of two types. Packet data traffic is transported to the ATM backbone transport network comprising an ATM switch 90 over ATM interfaces at OC-3 or OC-12 rates. TDM circuit traffic is provided by a DS3 interface at the OLT for connection to digital cross-connect or fiber multiplexer equipment in the CO.

A vendor-supplied EMS 94 is used to manage APON network elements. A test harness 96 in accordance with the present invention is used to test compliance of the vendor-supplied EMS 94 with SBC requirements in the RFP. The test harness 96 provides evaluation results for the EMS supplied with APON equipment as well as a local craft application called a local craft terminal 100.

As illustrated, an Ethernet hub 102 interconnects the test harness 96, the vendor-supplied EMS 94, the OLT 80, the ATM switch 90, EMS GUIs 104 and 106, and the Internet 110. The call-out boxes in FIG. 3 indicate the messaging mechanisms used to convey management information and the data communications networking used.

A particular testing configuration comprises a Sun Microsystems Ultra™ 60 hardware platform with Solaris™ 2.7 operating system. A Dell Poweredge™ 2400 or an alternative computer having an Intel processor and LINUX UNIX software is to store all historical records including alarms, creation and deletion events, and performance statistics. A laptop computer with Microsoft NT™ operating system, was provided for testing of the local craft terminal 100. Other types of hardware and software platforms may be substituted for the aforementioned platforms as those having ordinary skill will recognize.

The RFP for fiber-to-the-business contained IDL specifications for mechanization of alarm notification from the EMS, profile object creation requests by an NMS client with creation notification by the EMS, and bandwidth verification and provisioning of newly-installed equipment. It also provides naming graphs for objects to be implemented on both sides of the EMS-NMS interface defined by the IDL specifications as well as definitions of the methods and exceptions to be raised. Based on this information, the CORBA test harness 96 provides an NMS proxy developed in JAVA for the purpose of simulating the NMS functionality described by the specification. In other words, the test harness 96 simulates NMS client requests, contains functionality defined by a Notification Service as specified by Object Management Group (OMG); and hosts a shared naming service used by both the EMS and the NMS.

Testing using the test harness 96 involves the following different levels of compliance verification. Level 0 compliance verification includes testing for ORB interoperability, correct pragma prefix use (i.e. correct use of a DNS-like dotted notation used to make a variable unique), and location of the Naming Service. Level 1 compliance verification includes testing that valid method invocations cause expected results and invalid method invocations raise proper exceptions. Level 2 compliance verification includes scenario testing using multiple invocations demonstrating application integrity.

The way in which the CORBA test harness 96 may be used to execute testing of any EMS application implementing the IDL specification is described hereafter. Simple manipulation of data files using a UNIX text editor allows great flexibility in testing, especially in the case of adding specific identifiers generated by the EMS application as part of an NMS client method invocation. The data files may be parsed to generate the test scripts. Tests may be run individually or as a suite using the tester GUI. The results may be logged in files.

A detailed description follows of tests to ensure that the APON EMS correctly implements the EMS-NMS interface behavior as specified in "Technical Requirements for ATM Passive Optical Network (APON)—Fiber to the Business", SBC, Sep. 1, 1999. The tests may be limited to checking the functionality of this interface and may not address other EMS functionality issues. The EMS-NMS test framework simulates the actions and reactions of higher level NMS systems by driving the EMS-NMS interface to simulate appropriate responses from the EMS. It will also be configured as a consumer of Notification Service events that are generated and sent by the EMS. The test framework reads these messages and verifies that the event data contents are correct for the appropriate scenario. For example, if a communication alarm event is received, the alarm type is compared to an expected alarm type for the scenario, the data contents of the alarm are checked for correctness, and it is verified that the alarm reflects the actual alarm condition (whether real or simulated).

Objectives of the tests are to verify that the EMS conforms to the EMS-NMS interface as specified in the APON Technical Requirements document. Inter-operation with the NMS is tested to determine if the interface implementation adheres to the specified IDL. Functional responses are tested to determined if the EMS responds correctly to stimuli from the NMS. Functional action is tested to determine if the EMS interacts with the NMS when receiving stimuli from external systems such as network elements. Additionally, EMS initialization tests are performed to ensure that the EMS registers externally used objects correctly.

Therefore, the tests may be divided into four distinct categories: initialization testing, interface testing, NMS actions and EMS actions. Initialization testing comprises determining that initialization actions required of the EMS on startup are correctly performed. Interface testing comprises validating that the EMS implementation of the EMS-NMS Interface conforms to the IDL definition provided in the APON Technical Requirements document. These tests not only ensure that the EMS implementation of this interface operates in desirable-condition scenarios (e.g. so-called "sunny day" scenarios), but also that the EMS implementation of the interface recognizes error conditions and responds appropriately. NMS actions testing comprises determining if the EMS responds appropriately (via the EMS-NMS Interface) when the NMS (simulated by the test framework) requests an operation. This sequence of tests differs from the interface testing in that a complete usage scenario (based on the use cases defined in the APON Technical Requirements document) is considered rather than concentrating on a lower level technical definition of the interface functionality. EMS actions testing comprises determining that the EMS responds appropriately to external stimuli from a third-party system, such as network elements. Network error conditions are simulated and the test framework registers with the SBC Notification Service to receive any alarm events sent by the EMS. The alarm event types are checked to ensure that the alarm event is appropriate for the error condition. The data contained in the alarm event are examined to ensure that it relates to the actual error that has been simulated.

Figure 4:
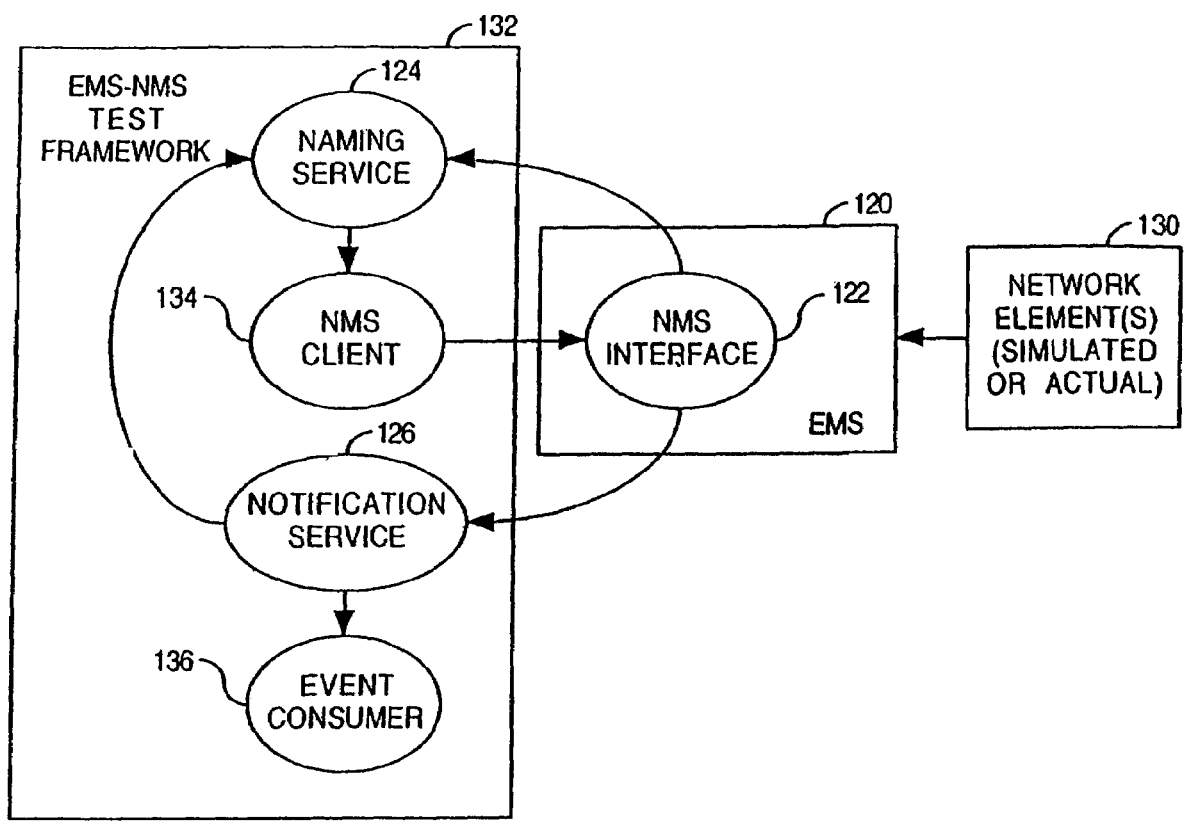
FIG. 4 is a block diagram of an embodiment of an environment to test a vendor-supplied EMS.

FIG. 4 is a block diagram of an embodiment of an environment to test a vendor-supplied EMS 120. The vendor-supplied EMS 120 may be contained in a separate host computer to the test framework and is connected via a test laboratory local area network (LAN). An EMS-NMS interface implementation 122 is provided as a part of the vendor-supplied EMS 120. Upon startup, interface objects register themselves in a Naming Service component 124 so that they can be located by other system elements. The naming convention and naming hierarchy is defined in the APON Technical Requirements document. The EMS-NMS interface 122 will also register as an event supplier to various Notification Service 126 event channels. The appropriate channels are located via the Naming Service 124.

Network elements 130 managed by the EMS 120 may be either simulated or actual. If the network elements 130 are simulated using software, the simulator is to responsible for creating error conditions and alarm messages and notifying the EMS 120 about the conditions. The simulation software generates multiple concurrent alarms to trigger the EMS root cause analysis mechanism. A list of required alarms from the different network elements is given in the APON Technical Requirements document.

An EMS-NMS test framework 132 is hosted on a workstation connected to the test laboratory LAN. The framework 132 may be implemented using the following software packages: Sun Java JDK™, Iona Technologies' Orbix™, and OpenFusion™ Naming Service and Notification Service.

The framework 132 provides an EMS-NMS interface client 134 which is used to drive the EMS responses to various NMS inputs. The client 134 simulates the operation requests from the NMS to the EMS 120. On initialization, the client 134 resolves the EMS-NMS interface 122 objects from the Naming Service 124.

The Naming Service 124 acts as a directory service so that various CORBA objects, in both the test framework 132 and the EMS-NMS interface 122, can be located. The Naming Service 124 is an instance of the OpenFusion™ Naming Service product.

The Notification Service 126 is responsible for receiving event messages from the EMS-NMS interface 122 and forwarding them to any registered consumers. The Notification Service 126 is configured with all the necessary event channels already created. The event channels are registered with the Naming Service 124, enabling location thereof by other system elements. The Notification Service 126 is an instance of the OpenFusion Notification Service software product.

An event consumer component 136 receives alarm event messages from the Notification Service 126. The Notification Service event channels are located via the Naming Service 124.

Next, a more detailed description of how the test harness acts to carry out the four testing categories is provided.

Initialization Testing

The following acts are performed prior to performing an initialization test: the Naming Service 124 is started, the Notification Service 126 is started, the naming hierarchy structure is created in the Naming Service 124, and event channels (RCAA, AlarmSequence, and profile object) are created and registered with the Naming Service 124 in accordance with the naming hierarchy and naming scheme defined in the APON Technical Requirements document. The initialization test itself comprises an act of starting the EMS 120. The results tested comprise: using a browser of the Naming Service 124 to check that the EMS-NMS interface objects have been registered in accordance with the proper naming hierarchy and naming scheme, and using a browser of the Notification Service 126 to check that the EMS 120 has registered as a event supplier for the predefined event channels.

Interface Testing

The interface testing is performed after the initialization testing. The interface testing is intended to verify the correct functionality and inter-operation of the EMS 120 implementation of the EMS-NMS interface 122 prior to progressing to scenario based testing. The interface testing comprises testing each individual interface operation, checking for correct functionality in the "sunny day" situation (i.e. the parameters are all valid) and also testing for correct error handling when the parameters are not valid.

Note that due to the nature of some of the tests (e.g. those requiring the presence of configured network elements), it may not be possible to test the interface 122 in isolation in some cases. Therefore, these tests will be combined with the NMS actions series of tests.

In one embodiment, the follow functional testing is performed. Tests are performed on the supports( ) operation of ProfileObjectMgmt.ProfileObjectFactory for a plurality of valid profile types. In particular, the following supports( ) operation requests may be made: (a) profileType parameter set to AAL1 Profile (value=1); profileType parameter set to AAL5Profile (value=2); profileType parameter set to AlarmSeverityAssignmentProfile (value=3); profileType parameter set to ATMAccessProfile (value=4); profileType parameter set to BridgedLANServiceProfile (value=5); profileType parameter set to CESProfile (value=6); profileType parameter set to DS1 Profile (value=7); profileType parameter set to DS3Profile (value=8); profileType parameter set to EthernetProfile (value=9); profileType parameter set to QoSParameterProfile (value=10); profileType parameter set to TrafficDescriptorProfile (value=11); profileType parameter set to UNIProfile (value=12); and profileType parameter set to ThresholdData (value=13). The results tested comprise determining if each operation returns a corresponding value (TRUE or FALSE) depending on whether the given profile is supported by the EMS.

A test is performed on the supports( ) operation of ProfileObjectMgmt.ProfileObjectFactory for at least one invalid profile type. In particular, the following supports( ) operation request may be made: (a) profileType parameter set to 14. The result tested comprises determining that the operation returns a FALSE value.

Due to the limited interactions between the EMS 120 and NMS 134, tests associated with creating CORBA profile objects is limited to a repeat of the successful createProfileObj( ) operations associated with ProfileObjectMgmt.ProfileObjectFactory. Possible outcomes of the tests include: object successfully created, type mismatch exception raised, type unknown exception raised, invalid parameters exception raised, invalid parameters exception raised, invalid values exception raised, and a name-in-use exception raised. The results also examine the events received by the alarm consumer 136 to verify that an object creation event had been correctly generated and sent via the Notification Service 126.

A sequence of tests associated with bandwidth queries and provisioning operations is designed to ensure that the EMS 120 handles provisioning operations via the EMS-NMS interface 122. As well as testing for correct provisioning operations, this sequence of tests determines if the error handling implemented as a part of these operations is also performed correctly. This applies to the testing of the following operations:

ProvisioningandCapMgmt.CapMgmt.BWQuery,

ProvisioningandCapMgmt.ProvisionONT.NewONTLogical, and

ProvisioningandCapMgmt.ProvisionONT.RequestRanging.

Possible outcomes for the ProvisioningandCapMgmt.CapMgmt.BWQuery operation include: valid status returned, unknown object list exception raised, and unknown PON interface exception raised.

Possible outcomes for the ProvisioningandCapMgmt.ProvisionONT.NewON-TLogical operation include: successful operation, insufficient trunk port capacity list exception raised, unknown object list exception raised, unknown PON interface exception raised, insufficient PON port capacity exception raised, unknown trunk list exception raised, and invalid trunk assignment exception raised.

Possible outcomes for the ProvisioningandCapMgmt.ProvisionONT.Reque-stRanging operation include: successful operation, unknown PON interface exception raised, unknown OLT exception raised, ranging failure exception raised, unknown ONT exception raised, invalid serial number exception raised, and duplicate serial number exception raised.

The service provisioning process comprises the following acts and corresponding EMS-NMS interface 122 operations. First, a bandwidth query is performed for the service using the BWQuery( ) operation. Next, bandwidth is reserved using the NewONTLogical( ) operation. Thereafter, another bandwidth query is performed using the BWQuery( ) operation to check that the bandwidth for the new service has been reserved. Finally, the physical path connections for the service are made using the RequestRanging( ) operation.

Note that due to the unknown nature of the actual or simulated network elements 130 supplied by the EMS vendor, it may not be possible to define the data for these tests prior to the vendor equipment being configured in a test laboratory. In these cases, the test data file contains data place holders which are replaced with actual data values when the network element configuration is known.

Other interface objects which may be tested include, but are not limited to, AccessControlMgr, Alarm EventSupplier, SecurityEventSupplier, DiscoveryEventSupplier, Builder, RecordSetMgr, DownloadMgr, VersionRepository, MlBMover, ImpairmentPeristence, ReportController, ProfileUsageMgr, NERegistrar, ResourceAllocator, SchedulerMg r, ServiceProvisioner, NESynchronizer, TestActionPerformer, TransferMgr, ProfileConsumer and ProfileRetriever as defined in Q.834.4.

EMS Actions Testing

These tests determine whether or not the EMS 120 responds appropriately to external stimuli from a third-party system, such as the network elements. Network error conditions are simulated and the test framework 132 registers with the Notification Service 126 to receive any alarm events sent by the EMS 120. The alarm event types are checked to ensure that the alarm event is appropriate for the error condition. The data contained in the alarm event is examined to ensure that it relates to the actual error that has been simulated.

The types for alarms that can be generated within the network depends upon the network element equipment configured by the EMS vendor or on the capabilities of any network element simulator provided by the EMS vendor. However, the goal of the EMS actions tests is to exercise the EMS 120 in such a manner that every alarm type specified in the APON Technical Requirements document is tested. If some of these alarms cannot be generated or simulated using the available network element configuration, the test result is to be marked accordingly.

For each type of alarm generated, the alarm data will be checked to ensure that it: confirms to the naming and fixed header information conventions specified in the APON Technical Requirements document, contains the relevant data for the type of alarm, and is appropriate for the actual alarm conditions (e.g. correctly identifies the cause and location of the fault).

With respect to the entire disclosure provided herein, it will be apparent to those skilled in the art that the disclosed inventions may be modified in numerous ways and may assume many embodiments other than the preferred forms specifically set out and described herein. For example, embodiments of the present invention may be applied to testing for compliance with requirements other than the APON technical requirements, and interface standards other than Q.834.4. Also, embodiments of the present invention may be applied to any broadband access technology.

Accordingly, it is intended by the appended claims to cover all modifications which fall within the true spirit and scope of the present invention.

The invention claimed is:

1. A method executing within a computer having a processor, comprising:
   translating test scripts defining one or more tests in an interface standard into sequences of Common Object Request Broker Architecture (CORBA) messages; and
   determining whether an element management system (EMS) is compliant with the interface standard based on responses to at least one of the sequences of CORBA messages, the responses received from the EMS via a network management service (NMS) interface.

2. The method of claim 1, further comprising:
   executing at least one of the sequences of CORBA messages to test the EMS via the NMS interface for compliance with the interface standard.

3. The method of claim 2, wherein the interface standard is based on Q.834.4.

4. The method of claim 2, wherein a party other than a vendor of the EMS executes the at least one of the sequences of CORBA messages and determines whether the EMS is compliant with the interface standard.

5. The method of claim 4, wherein a customer of the EMS executes the at least one of the sequences of CORBA messages and determines whether the EMS is compliant with the interface standard.

6. The method of claim 4, wherein a carrier network executes the at least one of the sequences of CORBA messages and determines whether the EMS is compliant with the interface standard.

7. The method of claim 4, wherein a service provider executes the at least one of the sequences of CORBA messages and determines whether the EMS is compliant with the interface standard.

8. The method. of claim 2 wherein executing at least one of the sequences of CORBA messages to test the EMS via the NMS interface causes acts of:
   creating a naming hierarchy structure in a naming service;
   creating at least one event channel and registering the at least one event channel with the naming service;
   starting the EMS;
   determining whether at least one NMS interface object associated with the at least one event channel has been properly registered using the naming service; and
   determining whether the EMS has registered as an event supplier for the at least one event channel using a notification service.

9. The method of claim 2 wherein executing at least one of the sequences of CORBA messages to test the EMS via the NMS interface causes an act of:
   testing whether one or more valid method invocations cause expected results.

10. The method of claim 9 wherein executing at least one of the sequences of CORBA messages to test the EMS via the NMS interface causes an act of:
    testing whether one or more invalid method invocations raises a proper exception.

11. The method of claim 2 wherein executing at least one of the sequences of CORBA messages to test the EMS via the NMS interface causes an act of:
    performing every operation defined by an EMS-NMS interface definition language (IDL) interface specification of the interface standard.

12. The method of claim 2 wherein executing at least one of the sequences of CORBA messages to test the EMS via the NMS interface causes an act of:
    determining whether the EMS responds appropriately to at least one external stimulus from a network element.

13. The method of claim 2 wherein executing at least one of the sequences of CORBA messages to test the EMS via the NMS interface causes an act of:
    providing a simulated network error condition to the EMS;
    receiving an alarm event sent by the EMS in response to the simulated network error condition;
    determining whether the alarm event is appropriate for the simulated network error condition.

14. The method of claim 2 wherein executing at least one least one of the sequences of CORBA messages to test the EMS via the NMS interface comprises: performing at least one of an initialization test, an interface test, a NMS action, and a EMS action.

15. A computer-readable storage medium comprising a set of instructions to direct a processor to perform acts of:
    translating test scripts defining one or more tests in an interface standard into sequences of Common Object Request Broker Architecture (CORBA) messages; and
    determining whether an element management system (EMS) is compliant with the interface standard based on responses to at least one of the sequences of CORBA messages, the responses received from the EMS via a network management service (NMS) interface.

16. An apparatus comprising:
    a processor; a test harness which interfaces with a network management service (NMS) interface of an element management system (EMS), the test harness having an NMS client to test the EMS via the NMS interface for compliance with an interface standard;
    wherein the test harness is operative to translate test scripts defining one or more tests in an interface standard into sequences of Common Object Request Broker Architecture (CORBA) messages and to determine whether the EMS is compliant with the interface standard based on responses to at least one of the sequences of CORBA messages, the responses received from the EMS via the NMS interface.

17. The apparatus of claim 16 wherein the interface standard is based on Q.834.4.

18. The apparatus of claim 16 wherein the test harness is further operative to execute at least one of the sequences of CORBA messages to test the EMS via the NMS interface for compliance with the interface standard.

19. The apparatus of claim 18 wherein executing at least one of the sequences of CORBA messages to test the EMS via the NMS interface comprises performing at least one of an initialization test, an interface test, a NMS action, and a EMS action.

* * * * *